United States Patent [19]

Scherrer et al.

[11] 3,907,578

[45] Sept. 23, 1975

[54] COMPOSITIONS FOR INHIBITING THE CORROSION OF METALS

[75] Inventors: Claude-Jacques Scherrer, Le Havre; Jean-Louis Mauleon, Saint Addresse; Jean-Daniel Gmerek, Bleriot Place, all of France

[73] Assignees: Compagnie Francaise de Raffinage, Paris, France; Universal Oil Products Company, Des Plaines, Ill.; part interest to each

[22] Filed: Apr. 20, 1973

[21] Appl. No.: 353,048

[30] Foreign Application Priority Data

Apr. 18, 1972  France .............................. 72.13600

[52] U.S. Cl. ...................... 106/14; 21/2.7; 252/390
[51] Int. Cl. ............................................. C23f 15/00
[58] Field of Search ........... 106/14; 252/390; 21/2.7

[56] References Cited
UNITED STATES PATENTS

| | | | |
|---|---|---|---|
| 3,441,419 | 4/1969 | Atterby | 106/14 |
| 3,585,051 | 6/1971 | Johnson | 106/3 |
| 3,654,177 | 4/1972 | Foley | 252/356 |
| 3,669,615 | 6/1972 | Murray | 21/2.7 |

*Primary Examiner*—Lester L. Lee
*Attorney, Agent, or Firm*—James R. Hoatson, Jr.; Raymond H. Nelson; William H. Page, II

[57] ABSTRACT

Compositions for inhibiting the corrosion of metals which are contacted with water containing a chloride contaminant will comprise a mixture of a salt of a dicarboxylic acid and an aliphatic amine with a cyclic amine or a mixture of cyclic amines. The composition is exemplified by a salt of a dicarboxylic acid and oleylamine with a volatile cyclic amine comprising a mixture of pyridine, picoline, lutidine, aniline, quinoline, isoquinoline, toluidine, and heavy pyridine.

6 Claims, 3 Drawing Figures

COMPOSITIONS FOR INHIBITING THE CORROSION OF METALS

BACKGROUND OF THE INVENTION

It is known in the prior art that the corrosion of metals in contact with water or water vapors containing contaminants such as hydrogen sulfide may be inhibited by the addition of certain compositions comprising a low-boiling aliphatic monoamine containing from 1 to 6 carbon atoms either alone or in combination with a salt of a high-boiling aliphatic amine and a carboxylic acid. This inhibitor will prevent the corrosion of ferrous metals which have been exposed to corrosive hydrogen sulfide vapors and also to water which contains hydrogen sulfide. However, as hereinbefore set forth, these corrosion inhibitors are limited to the use of low boiling aliphatic monoamines as the volatile portion of the inhibitor, and to the inhibition of vapor phase and water phase corrosion by hydrogen sulfide.

In contradistinction to this, as will be hereinafter shown in greater detail, the present invention is concerned with a composition which will inhibit the corrosion of metals which are exposed to water or water vapor which contains chloride contaminants. These chloride contaminants are present in crude petroleum fractions and will upon contact with water, at temperatures commonly used in distilling crude petroleum, form hydrochloric acid.

The present invention concerns new corrosion inhibiting agents and especially agents for inhibiting the corrosion which occurs at the top of distillation columns.

It is known that distillation of crude petroleum at atmospheric pressure can be accomplished industrially only if precautions are taken to limit the corrosion of the installations.

Among these precautions, certain measures are taken upstream of the column and others downstream. Measures taken upstream comprise principally desalting of crude petroleum, for example by electrostatic means. The desalting may be followed by a complementary neutralization, for example, by addition of soda.

Measures taken downstream include injection of neutralizing agent in the overhead fraction of the distillation column and injection of corrosion inhibitor.

After desalting and possible complementary neutralization, for example, with soda, the crude petroleum still contains sodium chloride, calcium chloride and magnesium chloride. Unlike sodium chloride, which is stable, calcium chloride and magnesium chloride are hydrolyzed by water vapor at a temperature higher than about 120°C. and thus produce hydrochloric acid. Hydrochloric acid is concentrated in the overhead vapors, and in the water condensed from this vapor.

Crude petroleum, after stabilization, contains practically no dissolved hydrogen sulfide, however, the cracking of sulfur compounds which occurs during distillation, forms hydrogen sulfide, which is also removed overhead in the column.

In order to neutralize the acids present in the overhead vapors, a neutralizing agent, such as ammonia in gaseous phase or aqueous solution, is injected into the line which connects the top of the column to the condenser or into a reflux line at the top of the distillation column. This injection is designed to maintain the pH of the water which condenses in this line at a predetermined value or, more precisely, to keep pH variations within a predetermined range. The pH of this water is closely related to the salts formed in the column overhead vapor line. Thus, effective control of corrosion in the column overhead vapor line depends on close control of the pH of the water that condenses in this line.

A corrosion inhibitor is generally added downstream of the point of injection of the neutralizing agent. This inhibitor forms a film on all downstream metal surfaces or on the iron sulfide film covering the metal. The corrosion inhibitors available in industry are polar substances, usually nitrogen derivatives dissolved in a solvent. These products are only slightly volatile and decompose at about 250° C., thus they rapidly become concentrated by solubility into the phase consisting of liquid hydrocarbons, in such a way that they exercise their function only in the presence of the liquid hydrocarbon phase.

An object of the present invention is to extend the domain of action of the corrosion inhibitors even to areas where water condenses, to provide effective protection against corrosion of metal parts in contact with water vapor which may condense.

In one aspect an embodiment of this invention resides in a composition for inhibiting the corrosion of metals due to contact with water containing a chloride contaminant, said composition comprising a mixture of (a) a salt of a dicarboxylic acid containing from about 10 to about 50 carbon atoms and an aliphatic amine containing from about 10 to about 30 carbon atoms, and (b) a cyclic amine or a mixture of cyclic amines containing 10 or less carbon atoms.

Another embodiment of this invention is found in a process for the inhibition of corrosion of metal due to contact of said metal with water containing a chloride contaminant which comprises injecting a neutralizing agent into the upper part of a distillation column and thereafter injecting a corrosion inhibitor composition downstream of the injection point of said neutralizing agent, said inhibitor composition comprising a mixture of (a) a salt of a dicarboxylic acid containing from about 10 to about 50 carbon atoms and an aliphatic amine containing from about 10 to about 30 carbon atoms, and (b) a cyclic amine or a mixture of cyclic amines containing 10 or less carbon atoms.

The first active constituent of the composition of the present invention consists of a salt of a dicarboxylic acid and an amine.

Dicarboxylic acids containing from about 10 to about 50 carbon atoms, and preferably from about 20 to about 40 carbon atoms per molecule are suitable for the synthesis of this salt. Numerous acids answering to these characteristics are available in industry; these are generally mixtures of acids, and may contain impurities without this being a disadvantage. Acids sold under the commercial name of "VR-1 acid" — which are a mixture of polybasic, principally dibasic, acids and whose average molecular weight is about 750 — are suitable, the same applies to acids sold under the commerical names "Dimer-Acids", this name being used generally to characterize bifunctional carboxylic acids "D-50-MEX" a composite containing dimer-acids manufactured by the Harchem Division of Union Camp Corporation and "Empol 222". The latter is an acid corresponding to the following formula:

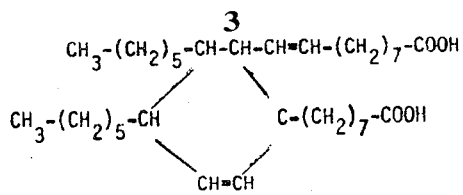

and its properties are the following:

| | |
|---|---|
| molecular weight | 600 |
| acidity index | 180–192 |
| iodine index | 80–95 |
| neutralization index | 290–310 |
| saponification index | 185–195 |
| index of refraction at 25° C. | 1.4919 |
| density at 15.5° C. in relation to water at 15.5° C. | 0.95 |
| flash point | 277° C. |
| ignition point | 316° C. |
| viscosity at 100° C. | 100 cst |

VR-1 acid is manufactured by Rohm and Haas Company and D50 MEX is manufactured by HarChem Co. The composition of these two acids is disclosed in U.S. Pat. No. 2,880,095 and U.S. Pat. No. 2,948,598.

In addition alkyl dicarboxylic acids, of which the alkyl portion comprises at least ten carbon atoms may also be used. Suitable acids include alkyl malonic acids, alkyl succinic acids, alkyl glutaric acids, alkyl adipic acids, alkyl pimelic acids, alkyl sebaric acids, alkyl phthalic acids. Mixtures of these acids as well as dicarboxylic acids of higher molecular weight are also suitable for reaction with the hereinafter set forth aliphatic amines.

Aliphatic amines containing from about 10 to about 30, and preferably from about 12 to about 20, carbon atoms per molecule are suitable for reaction with the aforementioned acids to form the desired salt thereof. These are monoamines such as a primary amine and belong to the group consisting of decylamine, undecylamine, dodecylamine, tridecylamine, tetradecyl-, pentadecylhexadecyl-, heptadecyl, octadecyl-, nonadecyl-, eicosyl-, heneicosyl-, docosyl-, tricosyl-, tetracosyl-, pentacosyl-, hexacosyl- heptacosyl-, octacosyl-, nonacosyl-, triacontylamine, the corresponding alkenylamines and mixtures of these amines. These amines are prepared from the corresponding fatty acids and can be named according to the acid from which they derive: laurylamine, myristylamine, palmityl- stearyl-, arachidyl-, palmitolyl-, oleyl-, ricinoleyl-, dinoleyl-, linolenylamine, etc. Mixtures of these amines are available under commercial names such as "Alamine H26D," "Armeen HTD." These products include mixtures of alkyl amines whose alkyl portions contain principally between 16 and 18 carbon atoms, and, in smaller quantities, 14 carbon atoms. Other fatty amines such as tallowamine, cocoamine, palmamine, etc. and their mixtures, as well as the hydrogenated derivatives of these amines may also be employed.

The salts of dicarboxylic acids and amines are obtained by any convenient means known in the art and, principally, by simply mixing acid and amine at room temperature, preferably with strong agitation. Higher temperatures may be employed but they should not exceed 90° C. to avoid formation of amides or other undesirable products. In general, the acid and amine are used in a ratio in the range of from about 1:1 to about 3:1 equivalents of acid per equivalent of amine. One molecule of dibasic acid contains two equivalents of acid, one molecule of monoamine contains one equivalent of base.

The second active constituent of the corrosion inhibitor consists of a cyclic amine or mixture of cyclic amines with ten or less carbon atoms. As used in the present specification and appended claims the term "cyclic amine" will include cycloaliphatic amines, aromatic amines and nitrogen-containing heterocyclic compounds. For the rest of the description, this constituent will be designated as "volatile amine," for its function is precisely to be condensed last and thus follow the water condensation. The volatile amine may be chosen from the group consisting of cycloaliphatic amines, aromatic amines and nitrogen-containing heterocyclic compounds. By way of example, one may cite morpholine, cyclohexylamine, aniline, crude or refined quinoline and pyridine bases produced from coal tar extracts, etc. These latter bases have a boiling point generally between 90° and 250° C. and are generally carried over with water vapor. They include the following nitrogen-containing cyclic compounds:

pyridine (1–2 percent), picolines (5–10 percent), lutidines (10–15 percent), collidines (4–6 percent), aniline (25–30 percent), toluidines (10–15 percent), quinoline (25–30 percent), isoquinoline (2–3 percent), quinaldine (3–4 percent), heavy pyridines (1–2 percent).

The volatile amine of the type hereinbefore set forth and the salt of the dicarboxylic acid and amine may be present in the composition in a range of from about 1:1 to about 1:20 weight percent of amine per weight percent of salt. If so desired, they may be dissolved in an aliphatic alcohol or in an organic solvent such as the aromatic hydrocarbons (benzene, toluene, xylenes, ethylbenzene, diethylbenzene, cumene, etc.), paraffinic hydrocarbons (hexane, heptane, octane, nonane, decane, undecane, dodecane, etc.). as well as mixtures of hydrocarbons such as the naphthas and kerosene, may be used.

In order to be industrially useful, the corrosion inhibitor should form a film on the parts to be protected, which film will not be stripped off by fluid flow and in addition the corrosion inhibitor should also affect the quality of the hydrocarbon products especially the gasolines removed overhead in the distillation column as little as possible, consequently the inhibitor should not promote an emulsification of oil and water.

The advantages of the present invention are illustrated by the following examples and graphic representations of test results.

EXAMPLE I

This example concerns the measurement of the amount of protection against corrosion of various inhibitors.

A distillation column with reflux of overhead material is fed by non-desalted Quatar crude petroleum, containing 1.2 wt. percent S, injected at a temperature of 220° C., with a flow rate of 4.7 liters/hour. Since the salinity of the crude petroleum is variable, a constant value of 50 ppm of chloride is maintained by addition of hydrochloric acid to the water vapor injected to simulate stripping. The stripping vapor is equivalent to 3 wt. percent of the feed or 10 wt. percent of the overhead vapor. The crude petroleum does not contain hydrogen sulfide. The crude is deaerated to contain less than 0.1 ppm of dissolved oxygen.

A comparison is made of the weight loss of the carbon steel samples in various zones of overhead vapor condensation, for various pH values (5, 6 and 7), which are maintained at a constant rate by the injection of ammonia. The corrosion inhibitor is injected downstream of the ammonia in a quantity equal to 10 ppm of overhead vapors. The results obtained are shown in Table I following: they are expressed in 1/100 mm of thickness of carbon steel loss per year.

$T_1$ is a commercially available corrosion inhibitor comprising a fatty alkanolamide and volatile amines; $T_2$ is a commercially available corrosion inhibitor which does not contain volatile compounds; $T_2'$ is obtained by adding to $T_2$ 15 percent by weight of a volatile compound; A is an inhibitor conforming to the invention.

A is composed of a mixture:

30 wt. percent salt of a carboxylic diacid ("D-50-MEX") and oleylamine, prepared by the reaction with agitation at room temperature and, of two equivalent acids to one equivalent amine.

30 wt. percent of a mixture of volatile amines extracted from coal tar; this mixture boils between 90° C. and 250° C. and contains:

|   | % |
|---|---|
| pyridine base | 1.0 |
| picolines +2,6 lutidine | 9.5 |
| lutidines | 15.5 |
| collidines | 6.0 |
| aniline | 26.5 |
| quinoline | 23.5 |
| isoquinoline | 2.5 |
| toluidines | 11.5 |
| quinaldine | 2.0 |
| heavy pyridines | 2.0 |
|   | 100.0 |

Figure 1:
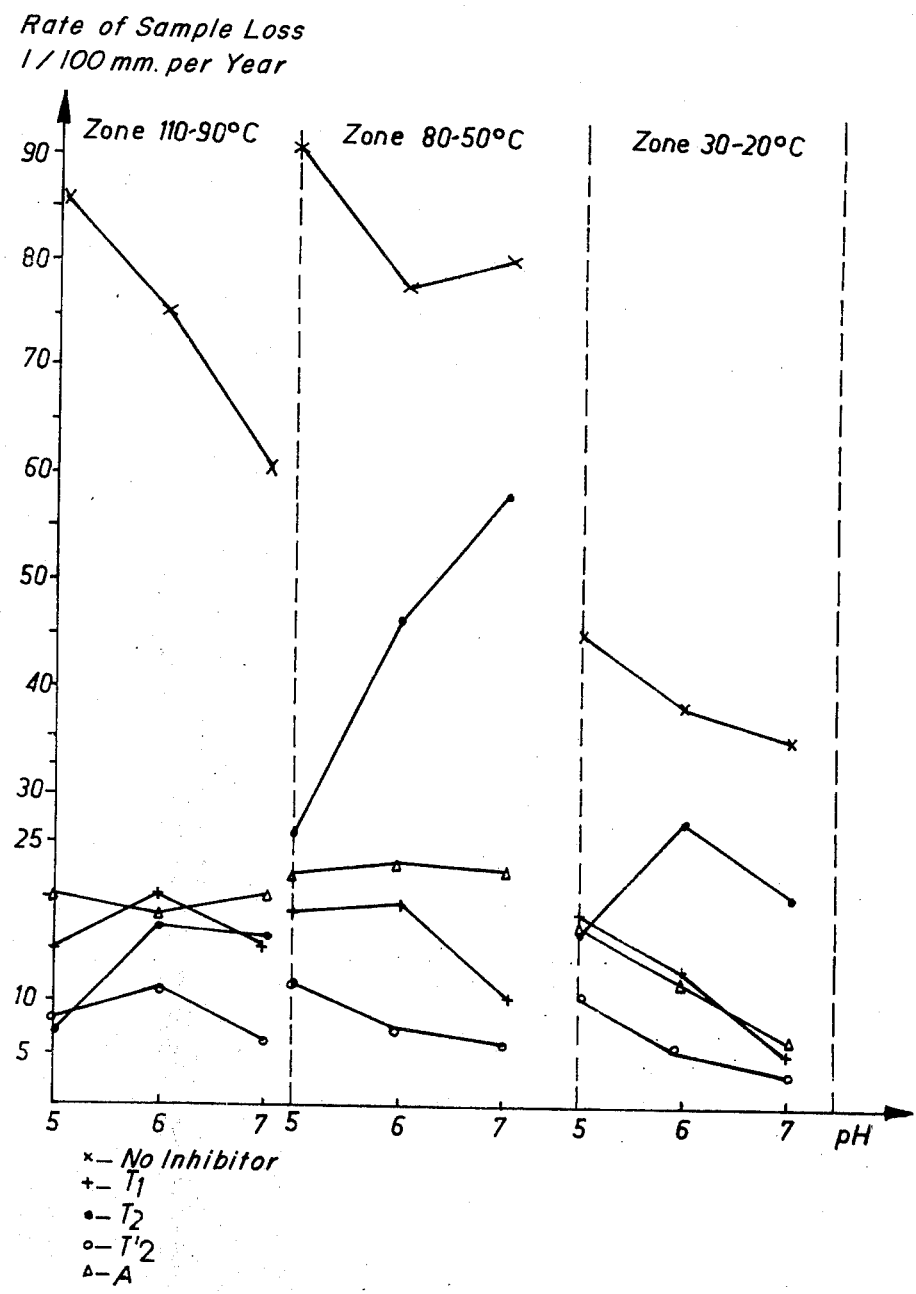
FIG. 1 is a graphic representation of the loss of thickness of carbon steel bars placed in different zones of condensation of overhead vapors, as a function of temperature and of pH.

40 wt. % solvent composed of catalytic naphtha.
FIG. 1 is a graphic representation of the results.

EXAMPLE II

This example shows the resistance of the inhibitor film to the stripping action of fluid flow.

Fluid velocities present in distillation columns overhead lines, where water and hydrocarbon condensation take place are, for gases between 15 and 40 meters/sec. and, for liquids between 3 and 6 meters/sec. Fluid flowing at these velocities may strip away the film of corrosion inhibitor.

A mixture of light desulfurized gasoline and an equal volume of decarbonated distilled water, having a controlled chloride and sulfur content, and a pH of 5 which is adjusted by the addition of ammonia, is agitated in an enclosure by means of a turbine. This agitation creates hydrodynamic conditions comparable to those existing at the industrial condensation point. A corrosion inhibitor is added in a quantity equal to 5 or 10 ppm of the total water-gasoline mixture.

A corrosion measuring device, whose electrodes are of soft steel, is placed in the enclosure. A resistant film of corrosion inhibitor is deposited on the corrosion measuring device.

The measurements are taken intermittently in the aqueous phase, after stopping agitation. They allow determination of the amount of protection of the device as a function of time for a relatively slow flow velocity of 1.3 meters/sec. then at a velocity of 5.5 meters/sec. Table II contains the results obtained for the inhibitors tested in Example I.

Figure 2:
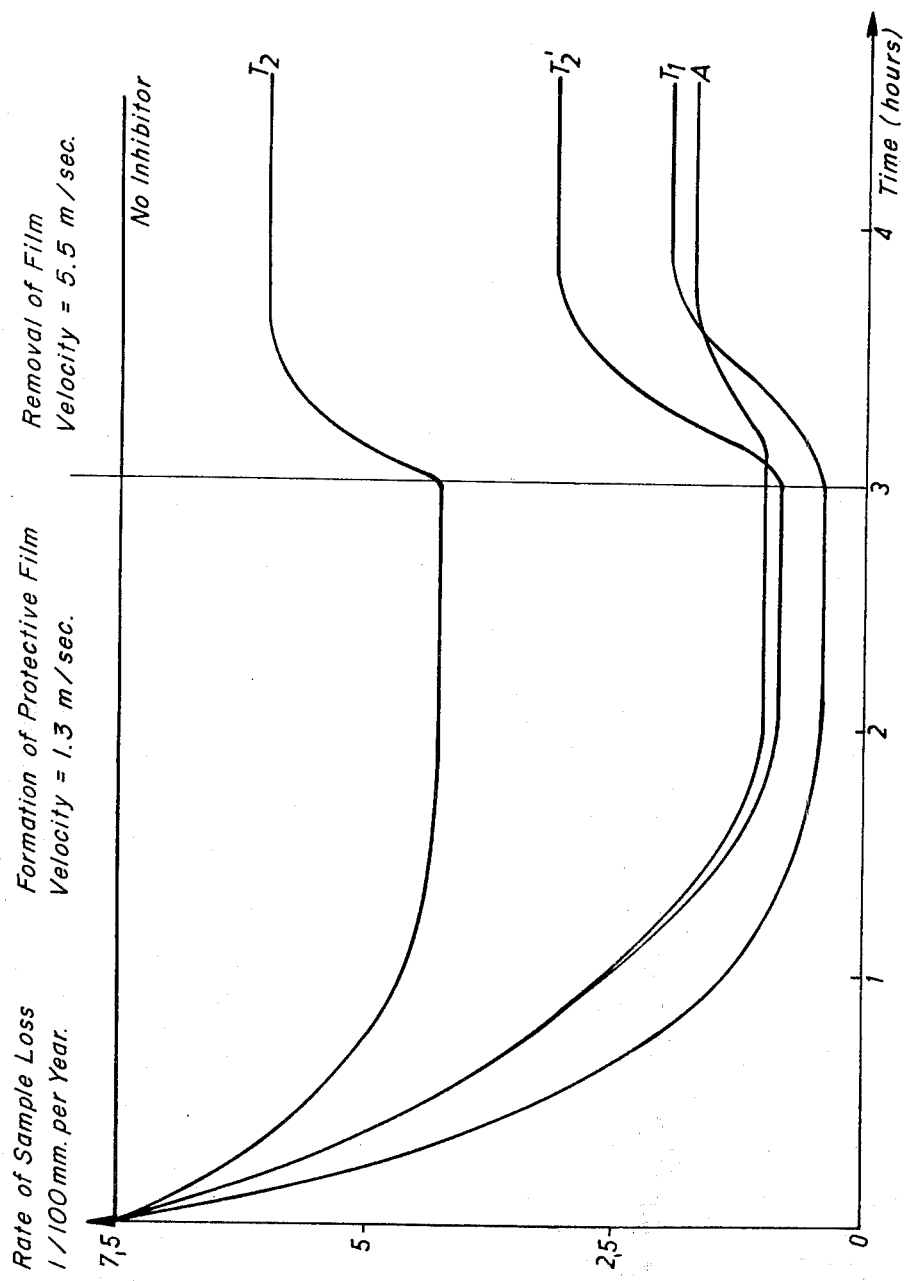
FIG. 2 is a graphic representation of the loss of thickness of the electrode of a corrosion measuring device as a function of time and of the hydrodynamic conditions of the flow of fluid on the electrode.

FIG. 2 represents the rate of corrosion of the device as a function of time under previously cited conditions for a corrosion inhibitor concentration of 10 ppm. The left portion corresponds to the formation of a protective film on the device. The existence of the film leads, more or less rapidly depending on the inhibitor, to a stabilization and reduction of the rate of corrosion. When the flow speed is increased, the film is stripped off to some extent. The rate of corrosion is stabilized at a value always higher than at slower flow velocity. The results are expressed in thickness lost per year (in 1/100 millimeters).

Inhibitor A, of the present invention, is remarkable in that the two corrosion values are very close to each other. Inhibitor A is only very slightly affected by the high fluid velocity. A synergistic effect, which was not foreseen, is exidenced.

TABLE 1

| Temperature | 110 – 90°C. | | | 80 – 50° C. | | | 30 – 20° C. | | |
|---|---|---|---|---|---|---|---|---|---|
| corrosion inhibitors ph | 5 | 6 | 7 | 5 | 6 | 7 | 5 | 6 | 7 |
| $T_1$ | 15 | 20 | 15 | 18 | 19 | 10 | 18 | 13 | 5 |
| $T_2$ | 7 | 17 | 16 | 26 | 46 | 58 | 16 | 27 | 20 |
| $T_2'$ | 8 | 11 | 6 | 11 | 7 | 6 | 10 | 5 | 3 |
| A | 20 | 18 | 20 | 22 | 23 | 22 | 17 | 12 | 6 |
| without inhibitor | 85 | 76 | 60 | 80 | 78 | 80 | 45 | 38 | 35 |

Values in table are reported as rate of metal loss, 0.01 mm/year.

TABLE II

| Inhibitor | Concentration (p.p.m.) | Flow Speed 1.3 meters/sec. Protection (%) Measured After | Flow Speed 5.5 meters/sec. | |
|---|---|---|---|---|
| | | | Loss of Protection (%) Measured After | Protection Remaining (%) |
| $T_1$ | 5 | 95.3 (1 hour 30 min.) | 28.6 (30 min.) | 66.7 |
| | 10 | 92.6 (2 hours) | 21 (36 min.) | 71.6 |
| $T_2$ | 5 | 40 (1 hour 18 min.) | 28.3 (42 min.) | 11.7 |
| | 10 | 50.5 (1 hour 25 min.) | 25.2 (42 min.) | 25.3 |
| $T_2'$ | 5 | 91.6 (1 hour 36 min.) | 26.6 (42 min.) | 65 |

TABLE II-continued

| Inhibitor | Concentration (p.p.m.) | Flow Speed 1.3 meters/sec. Protection (%) Measured After | Flow Speed 5.5 meters/sec. Loss of Protection (%) Measured After | Protection Remaining (%) |
|---|---|---|---|---|
| A | 10 | 83.3 (1 hour 24 min.) | 23.6 (42 min.) | 60 |
|  | 5 | 77.6 (1 hour 18 min.) | 9.7 (27 min.) | 67.9 |
|  | 10 | 79 (2 hours) | 5.7 (42 min.) | 73.3 |

EXAMPLE III

This example measures the emulsifying tendencies of water in gasoline in the presence of various corrosion inhibitors.

In a cylinder, 15 volumes of decarbonated water (having a controlled chloride and sulfide content) are dispersed by vibration in 100 volumes of light desulfurized gasoline to which has been added a corrosion inhibitor in an amount equal to 10 ppm. of water-gasoline mixture. The change of the water content of the gasoline is followed and measured by the Karl Fisher method.

The results obtained at various pH levels of water for the inhibitors tested in Examples I and II are assembled in Table III.

"Relative Emulsifying Tendency" means the ratio of water contents of gasoline with and without inhibitor measured after the gasoline samples stand for 10 minutes.

TABLE III

| Inhibitor | pH | Relative Emulsifying Tendency |
|---|---|---|
| $T_1$ | 5 | 1.3 |
|  | 6 | 1.3 |
|  | 7 | 0.2 |
| $T_2$ | 5 | 0.7 |
|  | 6 | 1.3 |
|  | 7 | 0.5 |
| $T_2'$ | 5 | 0.5 |
|  | 6 | 0.8 |
|  | 7 | 0.4 |
| A | 5 | 0.6 |
|  | 6 | 0.6 |
|  | 7 | 0.4 |

Figure 3:
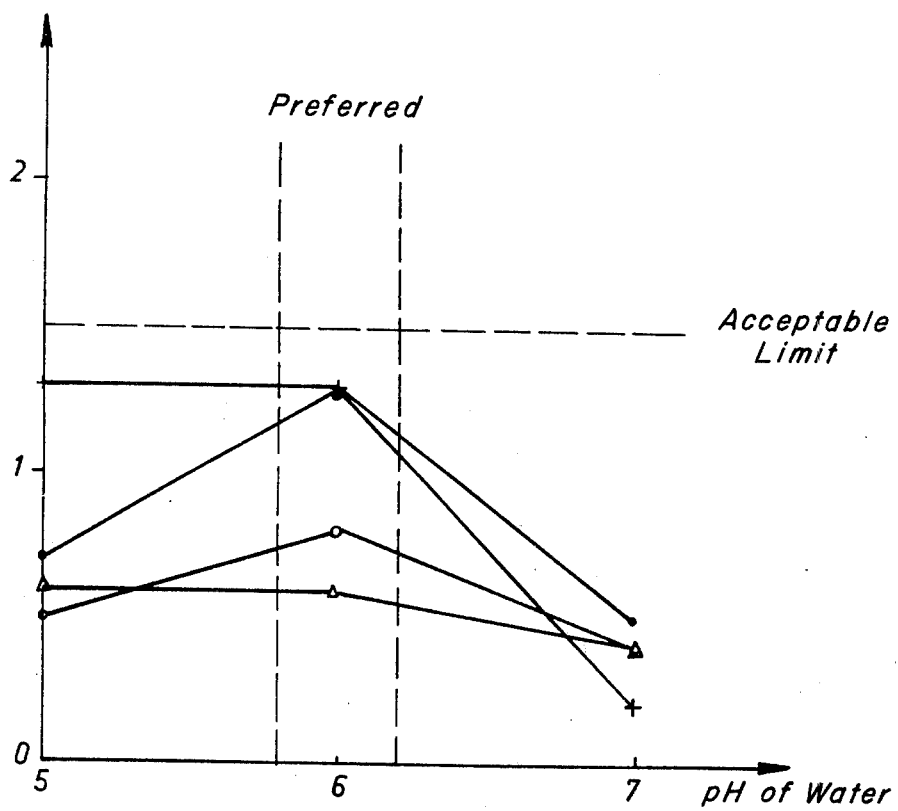
FIG. 3 is a graphic representation of the relative emulsive power of the different inhibitors as a function of pH.

FIG. 3 is a graphic representation of the results. The area suitable for consideration is preferably that between pH 5.8 and pH 6.2.

The preceding examples have shown the properties of inhibitors of the present invention; they realize a compromise which satisfies three requirements:
 i. protection against corrosion in water condensation zones,
 ii resistance of the protective film to pulling away in zones of severe hydrodynamic operation,
 iii minimal disruption of gasoline-water separation.

We claim as our invention:

1. A composition for inhibiting the corrosion of metals due to contact with water containing a chloride contaminant, said composition comprising a mixture of (a) a salt of a dicarboxylic acid containing from about 10 to about 50 carbon atoms and an aliphatic amine containing from about 10 to about 30 carbon atoms, said salt containing an acid to amine ratio of about 1:1 to about 3:1 equivalents of acid per equivalent of amine, and (b) a cyclic amine or a mixture of cyclic amines containing 10 or less carbon atoms.

2. The composition of claim 1 in which said dicarboxylic acid is selected from the group consisting of alkyl malonic acids, alkyl succinic acids, alkyl glutaric acids, alkyl adipic acids, alkyl pimelic acids, alkyl suberic acids, alkyl azelaic acids, alkyl sebaric acids, alkyl phthalic acids, and mixtures thereof.

3. The composition of claim 1 in which said aliphatic amine is selected from the group consisting of decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, triacontyl amine, laurylamine, myristylamine, palmitylamine, stearylamine, arachidylamine, palmitolylamine, oleylamine, ricinoleylamine, dinoleylamine, linolenylamine, and mixtures thereof.

4. The composition of claim 1 in which said cyclic amine is selected from the group consisting of cycloaliphatic amines, aromatic amines and nitrogen-containing heterocyclic compounds.

5. The composition of claim 4 in which said cyclic amine or mixture of cyclic amines is selected from the group consisting of morpholine, cyclohexylamine, pyridine and quinoline.

6. The composition of claim 1 in which said cyclic amine or mixture of cyclic amines is present in said composition in a ratio of from about 1:1 to about 1:20 weight percent of amine per weight percent of said salt of a dicarboxylic acid and an aliphatic amine.

* * * * *